Oct. 30, 1951        H. D. HARBY        2,573,016
HELICOPTER ROTOR CONTROL Filed Dec. 10, 1945        5 Sheets—Sheet 1

Fig. 1

INVENTOR.
HAROLD D. HARBY
BY
ATTY

Fig. 2

INVENTOR.
HAROLD D. HARBY
BY James M. Abbott
Atty.

Fig. 3

INVENTOR.
HAROLD D. HARBY

Oct. 30, 1951  H. D. HARBY  2,573,016
HELICOPTER ROTOR CONTROL
Filed Dec. 10, 1945  5 Sheets-Sheet 4

INVENTOR.
HAROLD D. HARBY
BY
James M. Abbott
ATTY.

Oct. 30, 1951         H. D. HARBY         2,573,016

HELICOPTER ROTOR CONTROL

Filed Dec. 10, 1945         5 Sheets-Sheet 5

INVENTOR.
HAROLD D. HARBY
BY
*James M. Abbott*
ATT'Y.

Patented Oct. 30, 1951

2,573,016

UNITED STATES PATENT OFFICE 2,573,016

HELICOPTER ROTOR CONTROL

Harold D. Harby, Los Angeles, Calif.

Application December 10, 1945, Serial No. 634,001

5 Claims. (Cl. 170—135.24)

This invention relates to aircraft, and particularly pertains to a helicopter.

During the development of aircraft, which is characterized as being heavier than air, numerous attempts have been made to produce an airplane which could ascend directly from the ground and could travel in any horizontal direction, and thereafter descend directly to the ground, thus eliminating the use of long runways and providing a simple mobile craft which could easily travel in the air, and which could land and take off without hazard. In designing aircraft of this particular type the problems have been made extremely complicated due to the fact that a structure was required using propellers which of necessity must be driven continuously, and which propellers require manipulation to establish and vary cyclic, total and differential pitch. Various attempts have been made to solve these problems in a simple manner, but in most instances heretofore it has been necessary to mount the propeller blades so that they could be manipulated individually and collectively with relation to a driving hub, which hub is driven by a complicated mechanism and along a devious path of power transmission. It is desirable, therefore, to provide an aircraft of the helicopter type which will be simple and sturdy in its construction and will not require a complicated control mechanism. It is the principal object of the present invention, therefore, to provide an aircraft of the helicopter type within which propellers are used having rigid blades carrying articulate members adapted to be easily manipulated without reference to the driving mechanism, and which blades are fitted with simple control means which may be used to establish or vary the effective cyclic total and differential pitch of the blades.

The present invention contemplates the provision of an airplane frame structure which may be suitably housed within a fuselage, and which structure supports a power unit, a vertical mast including two oppositely driven power shafts, each carrying a hub upon which radial blades are rigidly fastened, each of which blades is fitted with an articulate trailing edge, the structure being also supplied with power transmission means for the mast drive shafts and simple control means for varying the effective pitch angles of the blades as required in attaining cyclic total and differential pitch.

The invention is illustrated by way of example in the accompanying drawings in which.

Figure 1:
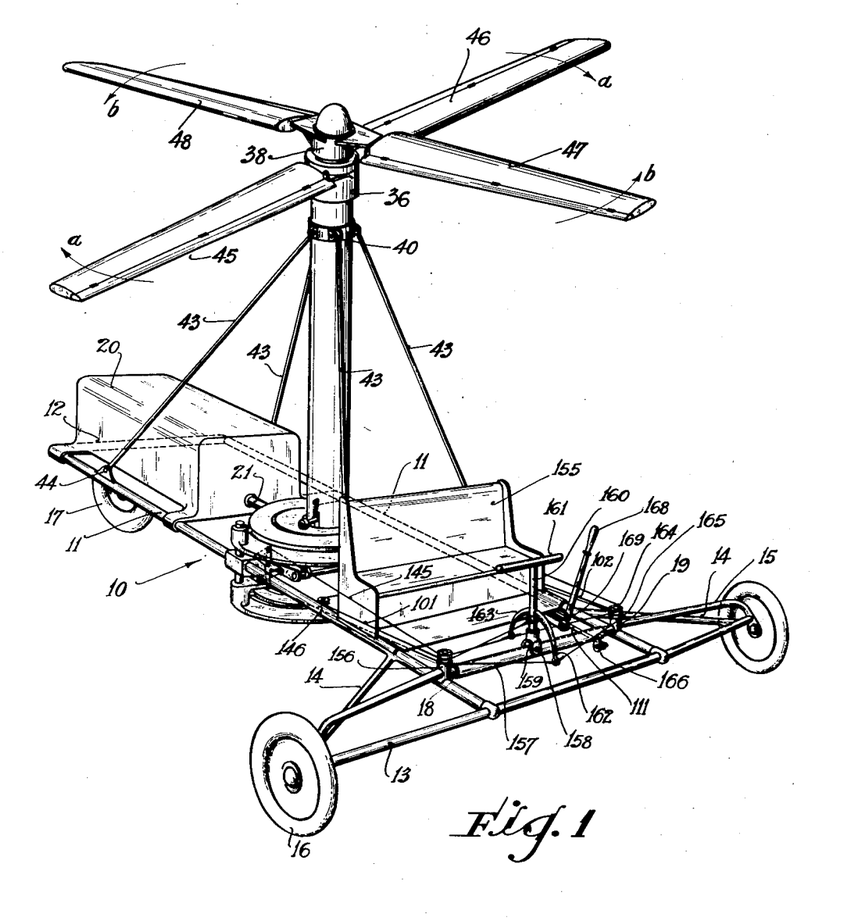
Figure 1 is a view in perspective showing the general arrangement of the essential parts of the present invention with the fuselage omitted for convenience in disclosure.

Referring more particularly to the drawings, 10 indicates a frame structure. It is to be understood that this frame may be built up as desired and the structure is merely illustrated by way of example. The frame is here shown as comprising opposite parallel side rails 11. They are connected by a rear transverse rail 12 and a forward transverse element 13. The forward transverse element 13 is here shown as provided with diagonal brace members 14 to give a rigid support for a wheel fork 15. This fork carries front landing wheels 16 which, with a rear landing wheel 17, provides the running gear for the vehicle. The wheel fork 15 has a horizontal central portion 18 which is secured to the side frame members 11 by fittings 19 which project upwardly from the two side frame members 11.

Mounted upon the rear portion of the frame is a power plant unit 20. The details of construction of this unit need not be explained, other than to state that a suitable prime mover forms a part thereof and is connected directly or through a transmission gear set with a drive shaft 21, here shown as extending forwardly from the unit 20. The drive shaft 21 transmits power to a combined drive and pitch control unit, generally indicated at 22. This unit is disposed between and suitably supported by the side rails 11 of the frame and in advance of the power unit 20. Extending upwardly from the drive and pitch control unit 22 is a vertical mast 23, the details of which will be hereinafter described.

Figure 2:
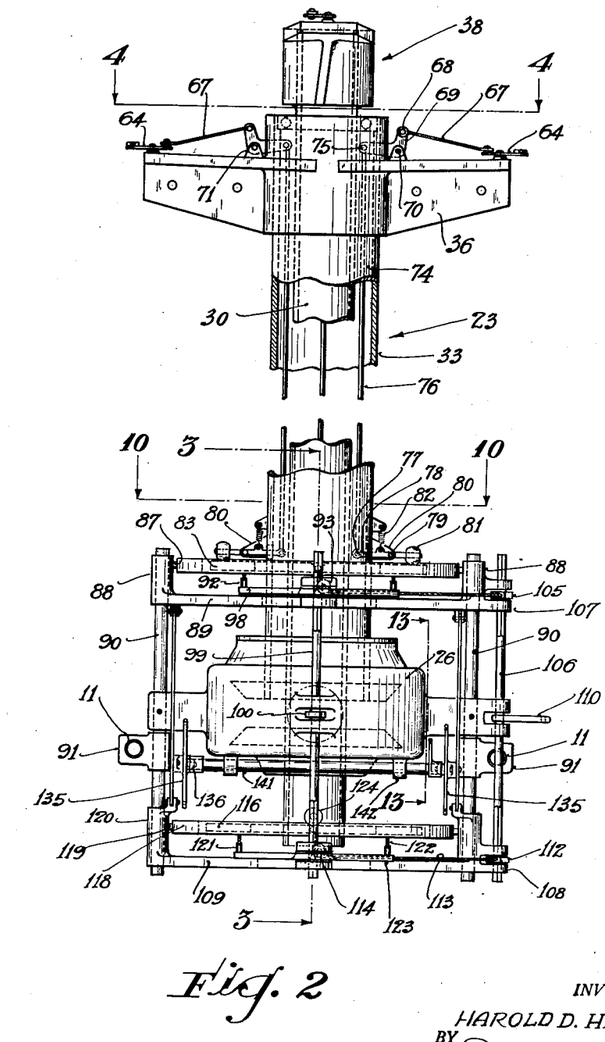
Fig. 2 is a view in elevation with parts broken away showing the mast and the power and control units associated therewith.
Figure 3:
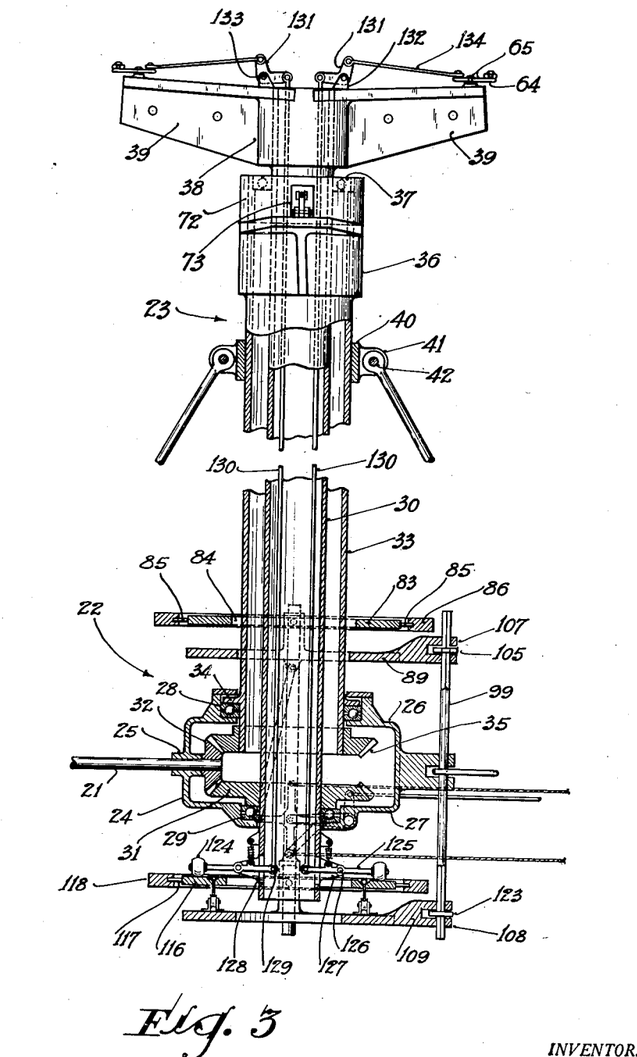
Fig. 3 is a view in central vertical section through the structure shown in Fig. 2 with parts broken away for the sake of convenience, and further indicating the details of construction of the drive and control.

The unit 22 comprises a housing 24 which is cylindrical and is positioned with its central axis vertically disposed. In one side wall of the housing is a bearing 25 which accommodates the drive shaft 21. In the top and bottom end walls 26 and 27 bearings 28 and 29 are provided. These bearings are here indicated as being anti-friction bearings rotating around the central vertical axis of the mast 23. The lower bearing 29 is a combined radial and thrust bearing through which an inner tubular mast shaft 30 extends. Fixed upon this shaft and resting upon the bearing 29 is a bevel gear 31 which is in mesh with a bevel pinion 32. The bevel pinion 32 is fixed upon the drive shaft 21. The upper bearing 28 circumscribes an outer tubular mast shaft 33. This shaft carries an annular flange 34 which rests upon the bearing 28 and supports the weight of the outer shaft 33. A bevel gear 35 is fixed on the lower end of the shaft 33 and is in mesh with the teeth of the pinion 32. It will be seen that the tubular shaft 30 telescopes within the tubular shaft 33 and thus provides the mast structure indicated generally at 23. In view of the fact that the bevel gears 31 and 35 are of the same diameter and are disposed concentrically of the vertical axis of the mast, and for the further reason that these gears are in simultaneous mesh with the drive pinion 32, it will be seen that the tubular shafts 30 and 33 will rotate in opposite directions around a common vertical axis at the same speed.

Mounted upon the upper end of the outer tubular shaft 33 is a mast-head 36. This head has a central passageway therethrough and carries an annular bearing structure 37 therein. Extending through the bearing structure 37 is the upper end of the inner tubular shaft 30 which is given suitable radial support by the bearing. Mounted upon the upper end of the inner tubular shaft 30 is an upper mast-head 38. Thus, the mast-heads 36 and 38 lie in parallel horizontal planes and rotate around the central vertical axis of the mast 23. By reference to Figs. 4 and 5 of the drawings it will be seen that each of the mast-heads 36 and 38 are formed with diametrically opposite rigid radial arms 39. The driving gears 31 and 35 are appropriately set with relation to the driving pinion 32 so as to insure that the radial axes of the arms 39 on the mast-head 36 will be at right angles to the radial axes of the arms 39 upon the mast-head 38. As previously explained there is a constant angular relationship between the mast-heads. By this it is meant that in any given period of time one head will revolve clockwise the same number of degrees that the other head revolves in a counter-clockwise direction. Thus, as seen in Fig. 1 of the drawing, the mast-head 36 rotates in the direction of the arrows $a$, and the mast-head 38 rotates in the direction of the arrows $b$. This of course is provided to stabilize the airplane and to counteract reaction forces set up between the propeller structures and the power unit in the body of the plane. The mast is rotatably supported near its upper end by a bearing ring 40, which is formed with ears 41 to receive pins 42. The pins 42 extend through eyes of brace rods 43 which extend outwardly and downwardly and are fastened to the side elements 11 of the frame 10 by brackets 44.

Figure 5:
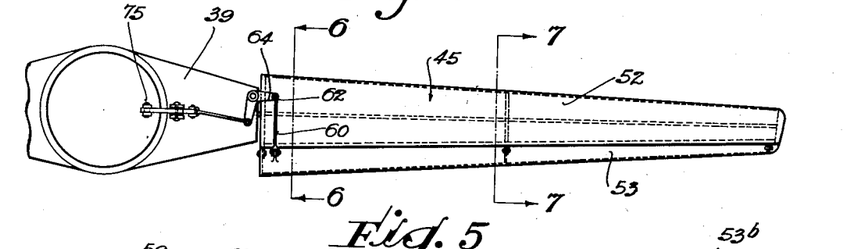
Fig. 5 is a fragmentary view in plan showing the mast-head and one of the propeller blades associated therewith.
Figure 6:
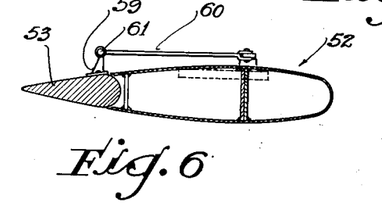
Fig. 6 is an enlarged view in transverse section through one of the propeller blades, as shown on the line 6—6 of Fig. 5, and discloses the articulate trailing edge.
Figure 7:
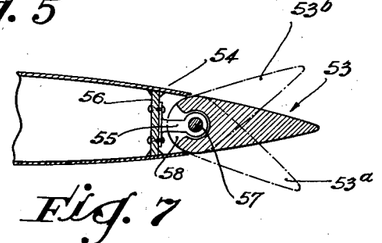
Fig. 7 is an enlarged fragmentary view in transverse section showing the hinge mounting for the articulate trailing edge of a propeller blade, as seen on the line 7—7 of Fig. 5.
Figures 8, 9:
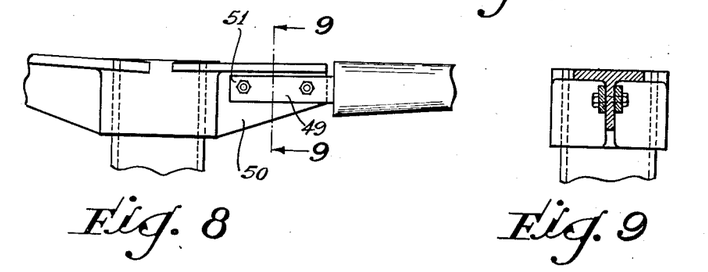
Fig. 8 is an enlarged fragmentary view showing the connection between the mast-head and one of the propeller blades.
Fig. 9 is a view in vertical section showing the blade connection as seen on the line 9—9 of Fig. 8.

The mast-heads 36 and 38 are designed to support propeller blades. The mast-head 36 carries propeller blades 45 and 46. The mast-head 38 carries propeller blades 47 and 48. As shown in Figs. 8 and 9 of the drawings these blades are fitted with U-shaped bolting brackets 49 which straddle vertical webs 50 forming a part of the radial arms 39 of each head. Bolts 51 secure the brackets in position and thus hold the blades in a permanent rigid position. As shown in Figs. 5, 6 and 7, it will be seen that the blades have a rigid portion 52 and an articulate trailing edge 53. The rigid portion 52 and the articulate trailing edge have the sectional form of an air foil, although the horizontal width of the blade and its trailing edge is gradually reduced toward the tip of the blade. The entering edge of the portion 52 presents a surface of semicircular cross-section. The trailing edge of the portion 52 terminates in wall extensions 54 between which horizontal hinge brackets 55 are positioned. These brackets are secured to vertical brace members 56, it being understood that the portion 52 of the propeller is of shell-like construction. At the rear end of the bracket 55 a hinge pin 57 is mounted. This extends through hinge plates 58 which are fastened into transverse slots in the body of the articulate trailing edge 53. By reference to Figs. 6 and 7 it will be seen that the articulate trailing edge is substantially triangular in cross-section, and that due to this arrangement the trailing edge may be moved from a horizontal position to upper and lower dotted line positions, as indicated at $53^a$ and $53^b$ in Fig. 7 of the drawings.

The manipulation of the articulate trailing edges of the propeller blades produces control of the cyclic total and differential pitch of the propeller. It is of course understood that total pitch is maintained by manipulating the propeller blades around their longitudinal axes so as to simultaneously increase or decrease the pitch of all of the blades. This will cause the lift of all of the blades to increase or decrease in unison so that the aircraft would either ascend or descend, as desired. It is possible to obtain this result by changing the rate of rotation of the propellers but this of course would not produce total pitch variations except when the engine is operating.

In order to maneuver an aircraft of the helicopter type and to turn the craft to the right or left the drag on the blades of one propeller unit must be made greater than the drag on the blades of the other propeller unit. Thus, the craft will turn by torque reaction in the direction of the lesser drag. An increase of pitch of a propeller blade increases the drag, and conversely, a decrease of pitch decreases the drag. When the pitch of the blades of one propeller unit is set to increase the drag, and the pitch of the blades of the other propeller unit is set to decrease the drag, the craft will turn in the same direction as the direction of travel of the blades of lesser pitch. This type of pitch control will be herein designated as differential pitch control.

It will be understood from the foregoing that total pitch control of a helicopter of the type here shown will cause the craft to ascend or descend, and that differential pitch control will cause the craft to deviate to the right or to the left from a straight course of travel. It is also necessary to provide means for insuring lateral stability of the plane in its path of travel as well as to maintain it on its intended course. In order to achieve these results it is necessary to vary the pitch of the blades at any point throughout the entire 360 degrees of rotation of the blades around the axis of the mast. Thus if an air pocket should be encountered which would cause the aircraft to tilt toward one side, it would then be necessary to increase the pitch of the blade of the propeller on the low side while simultaneously decreasing the pitch of the blade on the opposite or high side. This will produce greater lift on the low side and will return the aircraft to level flight. However, in the event it is desired to intentionally achieve lateral movement of the aircraft it is necessary to tilt the aircraft intentionally in the direction of flight desired. This will cause the aircraft to move toward the low side, and this type of control of a helicopter is known as the control of cyclic pitch.

In order to set the blades of the propellers during rotation of the propellers to obtain total, differential, and cyclic pitch adjustment, each of the articulate trailing edges 53 is fitted with a bracket 59 to which is connected an operating link 60. This link is pivoted to the bracket 59 at one end by a pin 61. The opposite end of each of the links is pivoted by a pin 62 to one leg of a bell crank 64. The bell crank is mounted upon a pivot 65 which is fixed to extend vertically from the upper face of the radial arms 39 of each of the mast heads 36 and 38. The opposite leg of each of the bell cranks 64 is provided with a pivot pin 66 which receives a link 67. The links 67, which are carried upon the mast head 36, are connected by pins 68 with bell cranks 69. The bell cranks 69 are disposed in vertical planes and are thus at right angles to the bell cranks 64. The bell cranks 69 are mounted upon pivot pins 70 carried by brackets 71 which project upwardly from the upper faces of the arms 39 of the mast head 36. The position of the brackets 71 is contiguous to the cylindrical bearing portion 72 of the mast head 36, so that the horizontal arms of the bell cranks 69 will extend through openings 73 in the cylindrical bearing 72 and will terminate in an annular space 74 which occurs between the tubular shafts 30 and 33 of the mast. These inwardly extending bell crank arms carry pivot pins 75 to which the upper ends of operating rods 76 are connected. These rods extend downwardly and are pivotally connected at 77 to the inner ends of levers 78. The levers 78 are pivoted upon pins 79 carried by radially extending brackets 80 fastened to the outer surface of the tubular shaft 33. The outer ends of the lever arms 78 each carry a cam roller 81. Tension springs 82 act to urge the inner ends of the lever arms 78 upwardly and to urge the cam rollers 81 downwardly.

The cam rollers 81 rest upon the upper face of a cam ring 83. This ring is flat and has a central opening 84 through which the tubular drive shaft 33 extends. The opening is of sufficient diameter to provide clearance so that the ring 83 may have a vertical rocking action, as hereinafter described. Disposed at diametrically opposite sides of the ring and projecting from the outer circumference thereof are trunnions 85. These have bearings in a circumscribing gimbal ring 86 which normally lies in the horizontal plane of the cam ring. The gimbal ring is fitted in turn with diametrically opposite trunnions 87. These trunnions are at right angles to the trunnions 85. The trunnions 87 are rotatably supported in the sides of bearing sleeves 88. The bearing sleeves 88 are an integral part of a crosshead 89 which is mounted to move vertically as guided by crosshead posts 90. These posts are parallel to each other and to the central axis of the mast 23, and are fixed to the side frame elements 11 by suitable supporting brackets 91. Mounted upon the crosshead 89 and beneath the assembled gimbal ring 86 and the cam ring 83 are pulleys 92 and 93. The pulleys 92 are disposed upon diametrically opposite sides of the vertical axis of the mast 23 and in the vertical plane of the crosshead posts 90. The pulleys 93 are disposed upon diametrically opposite sides of the vertical mast 23 and in a vertical plane at right angles to the plane of the pulleys 92. The pulleys 92 are provided with cables 94 which are led beneath the pulleys and are fitted with ball ends 95 resting in seats 96 in the upper face of the cam ring 83 and at the upper ends of bores 97 through which the cables extend. The cables 94 lead forwardly and connect to opposite ends of a simple lever 98 which is mounted upon a vertical pivot shaft 99 at its center. Mounted upon pivot shaft 99 and extending at right angles to the longitudinal center of the lever 98 is a lever arm 100. This arm is attached to cables 101 and 102 which, when pulled alternately, will cause the lever structure to rotate around the axis of the pivot 99. The operating means for the cables will be described hereinafter.

The pulleys 93 act as guides for cables 103. One end of each of these cables extends upwardly through a bore in the cam ring 83 and is there secured. The other ends of the cables 103 connect to the opposite ends of a lever 105. This lever is mounted upon a vertical pivot 106. The pivot 106 is in the form of a rod which extends through upper and lower bearings 107 and 108 carried by the upper crosshead 89 and a lower crosshead 109. The lower crosshead will be described hereinafter. Mounted upon the pivot shaft 106 is a lever arm 110 which extends at right angles to the longitudinal center of the lever 105. This lever arm is provided with a rigid push-pull control rod 111 extending forwardly to be operated by the pilot in a manner to be hereinafter described.

At the lower end of the pivot shaft 106 a lever 112 is provided. At the free ends of this lever cables 113 are attached. These cables lead around pulleys 114 which are carried upon the lower crosshead 109 and agree with the cables 103 associated with the upper crosshead 89. These cables are attached to diametrically opposite sides of a cam ring 116. The cam ring 116 is provided with trunnions 117 which are carried in a gimbal ring 118. The gimbal ring 118 is fitted with trunnions 119 which are mounted in bearings formed within bearing members 120 which are a part of the crosshead 109 and which receive the posts 90. The crosshead 109 also carries pulleys 121. These pulleys are upon diametrically opposite sides of the center of the mast and receive cables 122. The cables 122 connect to the cam ring 116 at the opposite sides thereof and are led forwardly to a lever 123 which is fastened on the lower end of the pivot shaft 99. It will thus be seen that the alternate pull of the cables 101 and 102 will simultaneously swing the lever arms 98 and 123 to alternately pull the cables 94. This will act to cause the cam rings 83 and 116 to rotate upon their trunnions 85 and 117, respectively, and thus will dispose the cam rings in parallel selected planes at an angle to the horizontal.

The movement of the push-pull rod in either direction will rotate the pivot shaft 106 and will alternately pull on cables 103 and 113, respectively, since the ends of these cables are on the transverse center line occupied by the trunnions 65 and 117. A pull on one set of these cables will swing the gimbal rings 86 and 118 upon their trunnions 87 and 119, respectively.

The lower cam ring 116 receives cam rollers 124 carried upon lever arms 125. These arms are mounted upon pivot pins 126 which are carried in brackets 127. The brackets 127 extend radially from the central tubular drive shaft 39. The walls of the drive shaft, as indicated at 128, are slotted to receive the inner ends of the levers 125. These ends are pivotally connected at 129 to vertically extending operating rods 130 which are led up through the center of the tubular drive shaft 30 and pass through the mast-head 38, where they are pivotally connected to bell cranks 131. These bell cranks are mounted on brackets 132 carried by the mast-head 38 and are supported by pivot pins 133. The free arms of the bell cranks 131 are pivotally connected with links 134 which in turn connect with the bell cranks 64 of the upper mast-head.

From the foregoing it will be seen that the cam ring 83 and the gimbal ring 86 act through the cam rollers 81 and their levers 78 to change the pitch of the blades 45 on the lower mast-head 36. The cam ring 116 and the gimbal ring 118, acting through the cam rollers 124 and the levers 125, change the pitch of the upper propeller blades 47 carried by the mast-head 38. It will further be noted that due to the fact that the gimbal rings can be simultaneously tilted around their supporting axes, and that the cam rings can be simultaneously tilted around their supporting axes, the angular plane of the cam rings 83 and 116 may be set as desired throughout the 360 degrees of a circle, of which the vertical axis of the mast is the center.

It is also desirable to simultaneously and alternately vary the pitch of the blades of the two propellers without changing the settings of the gimbal and cam rings. This manipulation contemplates the simultaneous movement of the crossheads 89 and 109 toward and away from each other upon the vertical crosshead post 90. This is accomplished by providing crossheads 135 which are mounted upon pins 136. The pins 136 are pivotally mounted at the free ends of lever arms 137. These arms extend horizontally and are a part of bell cranks 138. The bell cranks have vertical arms 139 to which push-pull rods 140 are connected. The bell cranks are pivotally mounted upon a shaft 141 which extends horizontally and is supported transversely beneath the gear housing 26 in bearings 142. It is intended that when the push-pull rods 140 are operated the arms 137 will oscillate directly and will raise and lower the pin 136 which carries the cross levers 135. This raises and lowers crossheads 89 and 109 through rod 140, the lever 137, and the member 135. The cross levers have two diametrically extending arms 143 and 144 which usually stand in the vertical plane of the axis of pin 136. At the free ends of these cross levers operating cables 145 and 146 are connected. The cross levers also have horizontally extending arms 147 and 148. These arms are at right angles to the previously mentioned vertical arms. The arm 147 is provided with a link 149 which is pivoted to the arm at 150 and extends upwardly to the crosshead 89, where it is pivoted at 151 to the crosshead. The axis of the pivot is in the vertical plane of the axis of the shaft 136 and is thereabove. The free end of the arm 148 is provided with a pivot 152 to which a link 153 is connected. This link extends downwardly and is secured to the lower crosshead 109, where it is connected by a pivot pin 154. The axis of the pivot pin 154 is also in the vertical plane of the axis of the pin 136. It will thus be seen from this arrangement that an alternate pull on the cables 145 or 146 will tend to rotate the cross levers 135 around their axes and will act to draw the crossheads 89 and 109 toward each other or to separate them simultaneously.

The controls for the structure described in the foregoing specification are preferably located in advance of the pilot's seat 155. Here it will be seen that a transverse frame member 18 is provided. This frame member is cylindrical and extends horizontally between posts 156 projecting vertically and located substantially over side frame members 11. Rotatably supported upon the member 18 is a tubular torque tube 157. This tube is free to rotate on the member 18 and carries diametrically opposite extending trunnions 158 upon which a fork 159 is mounted. The trunnions are longitudinally aligned upon a horizontal axis extending longitudinally of the frame. The fork is thus free to swing around its trunnions in a transverse vertical plane. For accomplishing this a handle 160 extends upwardly from the fork and is provided at its upper end with a pair of T-shaped grips 161. The handle 160 is mounted within the fork member 158 so that it can rotate upon its longitudinal axis. Mounted upon the handle 160 and secured thereto at points above the fork 158 are arcuate arms 162 and 163. These arms extend downwardly and concentrically with relation to the horizontal axis of the torque tube 157 and terminate upon opposite sides of the torque tube and in the plane of the axis thereof. Connected to the arms 162 and 163 are the cables 145 and 146. These cables are led around pulleys 164 and 165, respectively, the pulleys being carried by the posts 156. Thus, as the control handle 160 is rotated upon its longitudinal axis by the T-handle grips 161 the cross levers 135 will be operated simultaneously around the axis of the pin 136 and will thus simultaneously move the crossheads 89 and 109 toward and away from each other, as guided upon the posts 90. Secured to the upper end of the fork 159 are the cables 101 and 102 which are connected to the lever arm 100 designed to actuate the lever 98 and to dispose the gimbal rings 86 and 118 at a desired angle to the horizontal.

Carried by the torque tube and extending downwardly therefrom is a rigid lever arm 166, to the free end of which push rod 111 connects. Thus, when the handle 160 is moved forwardly or rearwardly the torque tube 157 will rotate on its longitudinal axis and will actuate the lever arm 110 and the shaft 106. This in turn will act through the levers 105 and 122 and the cables 103 to tilt the cam rings 83 and 116 to a desired angle relative to the horizontal. It is to be understood that irrespective of the tilted position of the cam rings the springs 82 and 167 will act to hold the cam rollers 81 and 124 against the faces of the cam rings.

Mounted in convenient relation to the operating handle 160 is a pitch lever 168. This is carried on a horizontal pivot pin 169 supported on the frame of the aircraft and has a downwardly extending lever portion to which the push-pull rod 140 connects. Thus as the pitch lever 168 is swung around its pivot 169 the bell crank 137 will be actuated to raise or lower the pins 136 which carries the cross levers 135. By this arrangement the crossheads 89 and 109 will be simultaneously raised and lowered regardless of the distance they are spaced apart by the action of the cross levers 135 and regardless of the inclined setting of the gimbal rings and the cam rings.

It should be pointed out that the mounting of the propeller blades upon the mast heads 36 and 38 is such that the blades will be inclined upwardly. The dihedral angle here indicated is approximately three degrees, although I do not wish to be limited to this degree. The ribs which extend downwardly on the masts from the blade supporting portions are inclined at an angle which gives an optimum setting for auto-rotation in the event of power failure to the vertical and in the direction of travel of the mast heads.

Figures 10, 11, 12, 13, 14:
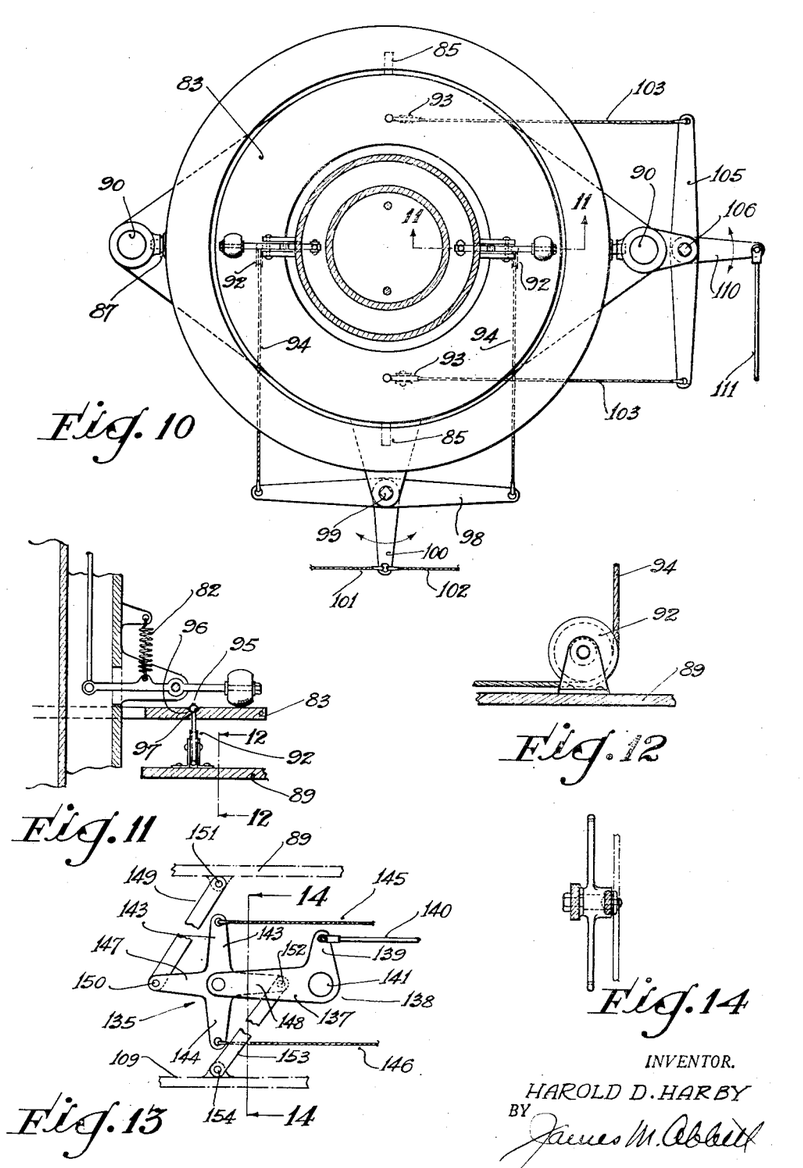
Fig. 10 is an enlarged view in horizontal section and elevation showing the mast and the top of the control mechanism, as seen on the line 10—10 of Fig. 2.
Fig. 11 is a view through one of the cam structures of the control mechanism, as seen on the line 11—11 of Fig. 10.
Fig. 12 is an enlarged fragmentary view showing a cable pulley, as seen on the line 12—12 of Fig. 11.
Fig. 13 is a fragmentary view in vertical section and elevation through a portion of the pitch control mechanism, as seen on the line 13—13 of Fig. 2.
Fig. 14 is a view showing one of the pitch control star wheels, as seen on the line 14—14 of Fig. 13.

In operation of the aircraft as here disclosed the power unit 20 is set in motion to drive the shaft 21. This shaft in turn acts through the driving pinion 32 to simultaneously drive the gears 31 and 35 in opposite direction. As has been explained previously the gear 31 is fixed to the inner tubular drive shaft 30 of the mast, and the gear 35 is fixed to the outer drive shaft 33 of the mast. Suitable conventional controls are provided for the power unit but are not indicated in the drawing, since their operation would be obvious. Suffice it to explain that the tubular drive shafts 30 and 33 will drive at uniform speed and that the speed may be accelerated or decelerated at the will of the pilot. It will be assumed that while the aircraft is standing on the ground and its power unit is in operation the cam rings 83 and 116 and the gimbal rings 86 and 118 will be properly aligned in parallel horizontal planes at right angles to the vertical axis of the mast, and that furthermore, the articulate trailing edges of the blades will be in the position shown in Figs. 6 and 7 to provide an air foil, the contour surface of which is continuous. When the gimbal rings and cam rings are thus aligned the levers 98 and 105 will stand in the positions shown in Fig. 10 of the drawing, and the lever arms 100 and 110 will stand at right angles to each other. At this same time the crossheads 89 and 109 will be spaced in their normal relation to each other with the lever arms 147 and 148 of the cross levers 135 standing horizontally, and the pin 136 lying in the horizontal plane of the pivot shaft 141 carrying the bell cranks 137. When it is desired to ascend the pitch lever 168 is swung forwardly.

Figure 4:
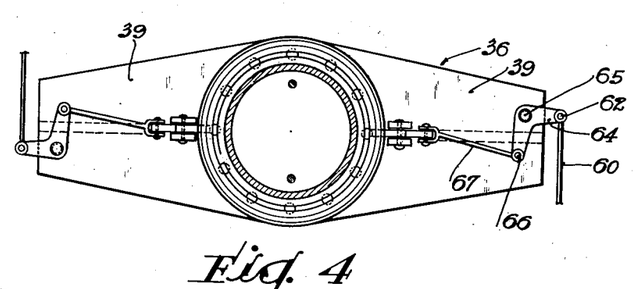
Fig. 4 is a view in transverse section through the mast as seen on the line 4—4 of Fig. 2 and shows the details of construction of the masthead.

This will pull on the push-pull rod 140 and will swing the pin 136 upwardly. Thus, the gimbal rings 89 and 109 will be lifted simultaneously. They will then act through the cam rings 83 and 116 to force upwardly on the cam rollers 81 and 124. This will pull downwardly upon the operating rods 76 and 130 and will swing the bell cranks 69 and 131 and pull upon the links 67 and 134 of each mast-head. The links will swing in the direction of the arrow c, as indicated in Fig. 4, and will force the links 60 in the direction of the arrow d. This will cause the articulate trailing edges to swing downwardly upon their pivot shafts 57 and thereby simultaneously increase the pitch and the "lift" of all of the propeller blades so that the aircraft will ascend. When the aircraft has reached a desired elevation the pilot may "level off" for flight by manipulation of the control lever 160. When the control lever is rotated upon its longitudinal axis by the handle grips 161 the cables 145 or 146 will be drawn as the arms 162 and 163 rotate around the axis of the handle 160. This will pull on one of the cables and pay out on the other cable. The arrangement of the cables 145 and 146 and the arms 162 and 163 is reversed on opposite sides of the control mechanism so that the two cross levers 135 will rotate in unison and in the same direction. When the control lever 160 is rotated around its longitudinal axis the cross-heads 89 and 109 will be drawn toward or away from each other, depending upon which way the control lever 160 is rotated. It will be seen that this action will take place regardless of the previous setting of the cross lever pin 136. This manipulation causes one set of propeller blades to have greater pitch than the other set and causes the aircraft to turn to the left or right, depending upon which set of blades has been given the greater amount of pitch. When the control lever 160 is pushed forwardly or drawn rearwardly the push-pull rod 111 will be actuated. This will tilt both of the cam rings 83 and 116 to give a fore or aft movement to the plane. When the operating lever 160 is swung to the left or right upon its pivot pin 158 the cables 101 and 102 will be alternately drawn or paid out. This will swing the shaft 99 and act through the levers 98 and 123 to tilt the gimbal rings 86 and 118 around their axes and will cause the aircraft to move in the direction the operating handle 160 is moved. While the present disclosure of the invention does not include any means for temporarily setting or holding the levers 160 and 168 in desired set positions it is evident that such means can be provided, and that they would be within the scope of the present invention.

It will thus be evident that the aircraft may be manipulated to move in any direction, and that since the cam rings 83 and 116 may be inclined around the axes of their trunnions, which are at right angles to the longitudinal center of the plane, the articulate trailing edges of the propellers on both mast-heads will automatically feather as the mast-heads rotate and as the cam rollers traverse the cam surfaces of the cam rings.

In order to bring the aircraft to a safe landing the controls may be restored to their original neutral positions and the plane may be lowered to the ground by proper manipulation of the pitch lever or by allowing the propellers to rotate under the force exerted by the air pressure as the plane drifts downwardly.

It will thus be seen that the aircraft of the helicopter type here shown provides a strong and durable structure in which the propeller blades are mounted upon the mast-heads rigidly, thus eliminating dangerous pivotal connections; the aircraft being further provided with simple and direct control means whereby cyclic, differential and total pitch may be easily established and controlled at all times.

While I have shown the preferred form of my invention as now known to me, it will be understood that various changes may be made in combination, construction and arrangement of parts by those skilled in the art, without departing from the spirit of the invention as claimed.

Having thus described my invention, what I claim and desire to secure by Letters Patent is:

1. In an aircraft of the helicopter type, a body structure, a vertical mast mounted thereon and including a tubular rotatable drive shaft, a mast head fixed on the upper end thereof, a plurality of variable pitch propeller blades mounted upon said head, actuating means between the propeller blades and the head whereby variable pitch can be attained, operating rods connected with said actuating means and extending downwardly through the tubular drive shaft, cam levers extending through the wall of the drive shaft adjacent the lower end thereof and mounted pivotally upon said drive shaft upon axes at right angles to the longitudinal axis of the drive shaft and disposed diametrically with relation thereto, the inner ends of said levers being attached to said operating rods, cam rollers carried at the outer ends of said levers, a cam ring circumscribing said drive shaft and with which the cam rollers engage, and a mounting for said ring adapted to support the ring and permit it to move bodily and longitudinally of the drive shaft to tilt the ring fore and aft of said drive shaft and to tilt the ring from side to side.

2. In an aircraft of the helicopter type, a body structure, a vertical mast mounted thereon including a pair of tubular drive shafts telescoping one within the other, a rotatable support for said masts, driving means for said tubular drive shafts whereby they will rotate in opposite directions around a common axis, mastheads, one fixed upon the upper end of each of said drive shafts, a plurality of variable pitch propeller blades mounted upon each of said mast-heads, operating means mounted upon each of said mast-heads and associated with the propeller blades carried thereby for varying their pitch, control rods for each of said operating means extending downwardly through the tubular drive shafts, a set of cam levers pivotally mounted upon the outermost tubular drive shaft and extending through the wall thereof, the inner ends of said cam levers being connected to the control rods extending from the mast-head carried by said outer drive shaft, said cam levers being disposed in a transverse plane above the power driving means, the outer ends of said cam levers carrying cam rollers, a set of cam levers pivotally mounted upon the innermost drive shaft and extending through the wall thereof, the inner ends of said levers being attached to the control rods extending from the mast-head carried upon the inner drive shaft, said last named levers being disposed in a transverse plane below that of the power drive for the shafts, cam rollers carried upon the outer ends of the last named set of levers, a pair of cam rings, one disposed in a plane above the driving means and engaged by the rollers carried by the upper cam levers, the other disposed in a plane beneath the driving means and engaged by the rollers carried by the lower cam levers, said cam rings normally being parallel and in spaced relation to dispose the variable pitch blades in a neutral position, a pair of gimbal rings, one circumscribing each of said cam rings and within which the cam rings are pivotally mounted upon axes extending longitudinally of the aircraft body, a pair of supporting members for the gimbal rings and by which the gimbal rings are pivotally mounted on transverse axes at right angles to the axes of the cam rings, rigid frame members upon which the gimbal ring supports are mounted for axial movement, means connecting said gimbal ring supports and whereby said supports may be axially moved in opposite directions, means supporting said connecting means whereby said axial supports may be axially moved simultaneously in the same direction without disturbing their spacing, means for tilting the gimbal rings around their pivotal axes, and means for tilting the cam rings around their pivotal axes.

3. In an aircraft having a mast including a pair of tubular driving shafts telescoping one within the other and carrying propellers formed with variable pitch blades at the upper ends of said shafts, a rotatable support for said drive shafts, pitch setting means for each propeller, actuating means therefor comprising levers, one of said actuating levers being for each pitch setting means and extending outwardly from the mast, the outer free ends of said actuating levers being disposed at different levels on the mast whereby they will travel in parallel planes around the central axis of the mast as the mast rotates, cam rings, one for the actuating levers at each level, means urging the outer free ends of said levers into contact with the respective cam rings, a pair of vertically movable supports, one for each cam ring, a pair of gimbal rings, one disposed between each vertical support and a corresponding cam ring whereby the pivotal axis of the cam ring upon the gimbal ring will be longitudinally of the aircraft and the pivotal axis of the gimbal ring will be at right angles thereto, control means connected with the gimbal rings and the cam rings whereby said gimbal rings and the cam rings may be tilted simultaneously or separately, an articulate connection between the vertically movable supports whereby said supports may be moved simultaneously toward or away from each other, control means connected with said vertically movable supports, and control means associated with said articulate connection whereby the vertical movable supports may be moved simultaneously in the same direction irrespective of their spacing.

4. The structure of claim 2 wherein a single control member is connected with the gimbal rings and the cam rings and upon manipulation may act to simultaneously or separately actuate said rings.

5. The structure of claim 3 including a single operating member, means connecting said single operating member with the cam rings and the gimbal rings whereby movement of said single operating member may simultaneously and separately operate said rings.

HAROLD D. HARBY.

(References on following page)

REFERENCES CITED

The following references are of record in the file of this patent:

UNITED STATES PATENTS

| Number | Name | Date |
|---|---|---|
| 1,524,309 | Perry | Jan. 27, 1925 |
| 1,697,009 | Isacco | Jan. 1, 1929 |
| 1,836,406 | Smith | Dec. 15, 1931 |
| 1,896,511 | Goldman | Feb. 7, 1933 |
| 1,912,354 | Pescara | May 30, 1933 |
| 1,917,965 | Gerhardt | July 11, 1933 |
| 1,938,091 | Wick | Dec. 5, 1933 |
| 2,025,561 | Wilford | Dec. 24, 1935 |
| 2,394,846 | Cox | Feb. 12, 1946 |
| 2,396,038 | Bossi | Mar. 5, 1946 |
| 2,399,076 | Trice | Apr. 23, 1946 |
| 2,410,533 | Thomson | Nov. 5, 1946 |
| 2,456,485 | Bendix | Dec. 14, 1948 |